United States Patent
Matsuba et al.

(10) Patent No.: US 11,872,524 B2
(45) Date of Patent: Jan. 16, 2024

(54) EXHAUST PIPE DEVICE

(71) Applicant: Kioxia Corporation, Tokyo (JP)

(72) Inventors: Hiroshi Matsuba, Fujisawa Kanagawa (JP); Akihiro Oishi, Yokohama Kanagawa (JP); Hiroyuki Fukumizu, Yokohama Kanagawa (JP); Kazuaki Kurihara, Yokkaichi Mie (JP)

(73) Assignee: Kioxia Corporation, Tokyo (JP)

( * ) Notice: Subject to any disclaimer, the term of this patent is extended or adjusted under 35 U.S.C. 154(b) by 32 days.

(21) Appl. No.: 17/358,202

(22) Filed: Jun. 25, 2021

(65) Prior Publication Data

US 2022/0062820 A1 Mar. 3, 2022

(30) Foreign Application Priority Data

Aug. 27, 2020 (JP) .................. 2020-143972

(51) Int. Cl.
*B01D 53/32* (2006.01)
*F01N 3/08* (2006.01)

(52) U.S. Cl.
CPC .......... *B01D 53/32* (2013.01); *F01N 3/0892* (2013.01); *B01D 2259/818* (2013.01); *F01N 2240/28* (2013.01)

(58) Field of Classification Search
CPC . B01D 53/32; B01D 2259/818; F01N 3/0892; F01N 2240/28; H05H 1/466; H05H 2245/40; H05H 2245/17; H05H 2242/10; H05H 1/24; H05H 1/2406; H01J 37/32348; H01J 37/32623; C23C 16/4408; C23C 16/4412; C23C 16/045; C23C 16/503; C23C 16/509; B65D 23/02; B65D 25/14
See application file for complete search history.

(56) References Cited

U.S. PATENT DOCUMENTS

| | | | |
|---|---|---|---|
| 5,735,451 | A | 4/1998 | Mori et al. |
| 6,158,648 | A | 12/2000 | Mori et al. |
| 9,494,065 | B2 | 11/2016 | Lee |
| 2007/0074662 | A1 | 4/2007 | Hirota |

(Continued)

FOREIGN PATENT DOCUMENTS

| | | |
|---|---|---|
| CN | 102383107 A | 3/2012 |
| CN | 102921676 A | 2/2013 |

(Continued)

*Primary Examiner* — Xiuyu Tai
(74) *Attorney, Agent, or Firm* — Foley & Lardner LLP

(57) ABSTRACT

An exhaust pipe device according to an embodiment includes a dielectric pipe; a radio-frequency electrode; a ground electrode; and a plasma generation circuit. The radio-frequency electrode is disposed on an outer periphery side of the dielectric pipe and a radio-frequency voltage is applied to the radio-frequency electrode. The ground electrode is disposed on an end portion side of the dielectric pipe such that a distance from the radio-frequency electrode is smaller on an inner side than on an outer side of the dielectric pipe, and a ground potential is applied to the ground electrode. The plasma generation circuit generates plasma inside the dielectric pipe. The exhaust pipe device functions as a part of an exhaust pipe disposed between a film forming chamber and a vacuum pump that exhausts gas inside the film forming chamber.

20 Claims, 7 Drawing Sheets

(56) References Cited

U.S. PATENT DOCUMENTS

| | | | | |
|---|---|---|---|---|
| 2008/0131333 A1* | 6/2008 | Tzeng | ............ | H05H 1/24 |
| | | | | 422/168 |
| 2010/0096393 A1* | 4/2010 | Asahara | ............ | H01J 37/32348 |
| | | | | 220/660 |
| 2014/0004009 A1 | 1/2014 | Lee | | |
| 2015/0306540 A1 | 10/2015 | Hur et al. | | |
| 2015/0314233 A1* | 11/2015 | Hur | ............ | H01J 37/32844 |
| | | | | 422/168 |
| 2020/0075297 A1 | 3/2020 | Oishi | | |
| 2021/0062337 A1 | 3/2021 | Matsuba | | |

FOREIGN PATENT DOCUMENTS

| | | |
|---|---|---|
| CN | 106165062 A | 11/2016 |
| JP | H07-245192 A | 9/1995 |
| JP | H11-029871 A | 2/1999 |
| JP | 2000-054147 A | 2/2000 |
| JP | 2002-343785 A | 11/2002 |
| JP | 2006-302625 A | 11/2006 |
| JP | 2013-004405 A | 1/2013 |
| JP | 2014-508029 A | 4/2014 |
| JP | 2015-213171 A | 11/2015 |
| JP | 2020-033619 A | 3/2020 |
| JP | 2021-031747 A | 3/2021 |
| KR | 10-2011-0123375 A | 11/2011 |
| KR | 10-1563193 B1 | 10/2015 |
| KR | 101557880 B1 | 10/2015 |

* cited by examiner

EXHAUST PIPE DEVICE

CROSS-REFERENCE TO RELATED APPLICATION

This application is based upon and claims the benefit of priority from Japanese Patent Application No. 2020-143972 filed on Aug. 27, 2020 in Japan, the entire contents of which are incorporated herein by reference.

FIELD

An embodiment of the present invention relates to an exhaust pipe device.

BACKGROUND

In a film forming apparatus represented by a chemical vapor deposition (CVD) apparatus, a source gas is introduced into a film forming chamber to form a desired film on a substrate disposed in the film forming chamber. The source gas remaining in the film forming chamber is exhausted by a vacuum pump through an exhaust pipe. There have been undesirable situations at that time such as closure of the exhaust pipe by deposition of products in the exhaust pipe due to the source gas, and stop of the vacuum pump downstream of the exhaust pipe by deposition of the products in the vacuum pump. In order to remove the deposit, a cleaning process by a remote plasma source (RPS) apparatus is performed. However, since an RPS apparatus generally focuses on cleaning in the film forming chamber, cleaning performance has been insufficient to clean products deposited in the exhaust pipe near the vacuum pump and the vacuum pump that are distant from the RPS apparatus.

Here, a technique is disclosed in which a radio-frequency electrode is disposed on the outer periphery of a conduit of an insulating substance such as ceramic or quartz, and a radio-frequency voltage is applied to the radio-frequency electrode using pipe flanges provided at both end portions of the conduit as ground electrodes to generate plasma inside the conduit. In addition, the technique performs removing unreacted gas and waste gas generated in the steps of ashing, etching, vapor deposition, cleaning, and nitriding by the plasma. However, in such a configuration, it is necessary to increase the distance between the radio-frequency electrode and the ground electrodes in order to avoid abnormal electric discharge such as arcing outside the conduit, and an increase in voltage is also limited. As a result, there may be a problem that plasma generation inside the conduit becomes unstable.

DETAILED DESCRIPTION

An exhaust pipe device according to an embodiment includes a dielectric pipe; a radio-frequency electrode; a ground electrode; and a plasma generation circuit. The radio-frequency electrode is disposed on an outer periphery side of the dielectric pipe and a radio-frequency voltage is applied to the radio-frequency electrode. The ground electrode is disposed on an end portion side of the dielectric pipe such that a distance from the radio-frequency electrode is smaller on an inner side than on an outer side of the dielectric pipe, and a ground potential is applied to the ground electrode. The plasma generation circuit generates plasma inside the dielectric pipe. The exhaust pipe device functions as a part of an exhaust pipe disposed between a film forming chamber and a vacuum pump that exhausts gas inside the film forming chamber.

Hereinafter, in embodiments, an exhaust pipe device capable of removing products deposited inside the exhaust pipe near the vacuum pump while avoiding abnormal electric discharge such as arcing will be described.

First Embodiment

Figure 1:
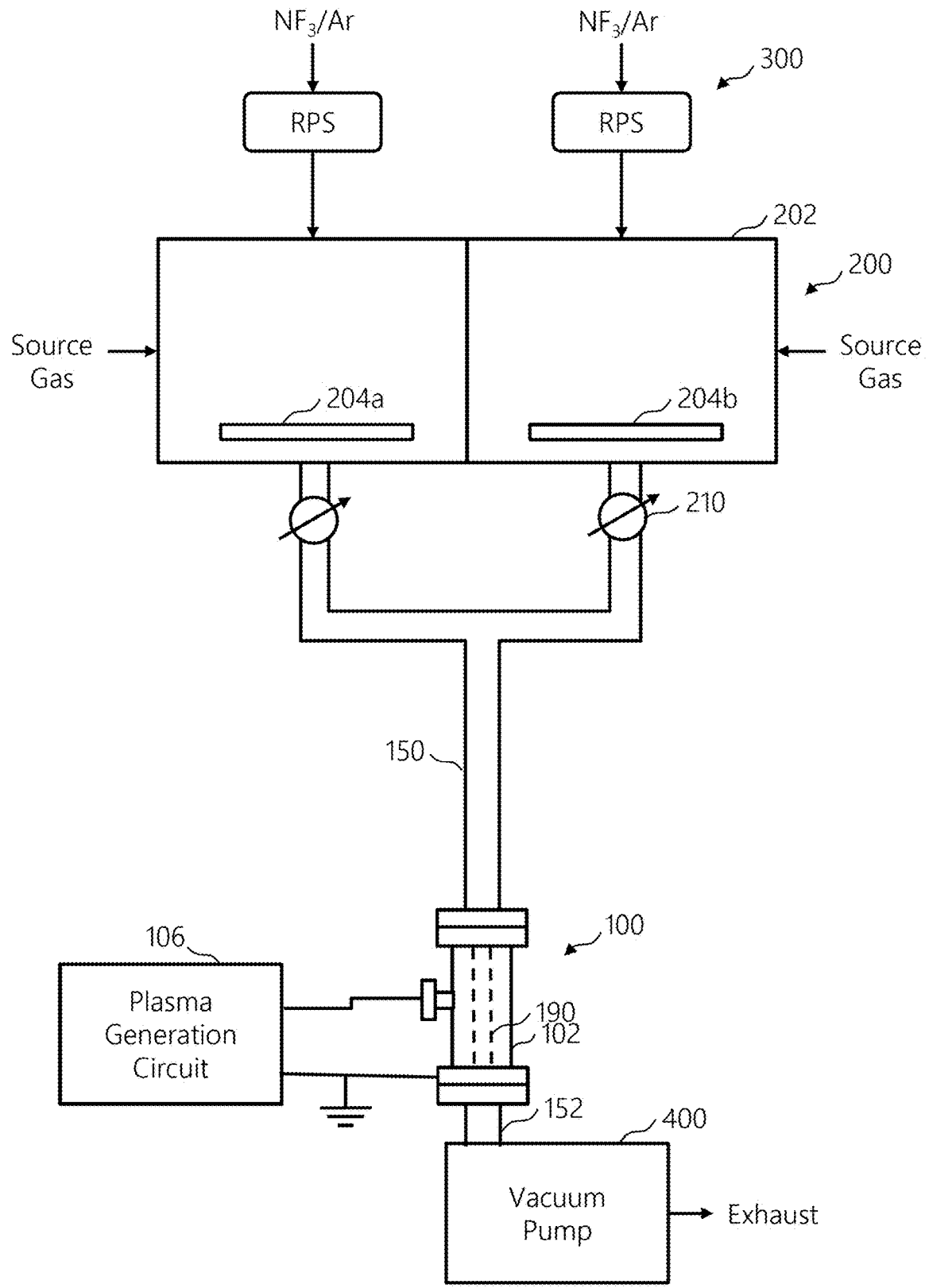
FIG. 1 is a configuration diagram illustrating an example of a configuration of an exhaust system of a semiconductor manufacturing apparatus according to a first embodiment.

FIG. 1 is a configuration diagram illustrating an example of a configuration of an exhaust system of a semiconductor manufacturing apparatus according to a first embodiment. In the example of FIG. 1, a film forming apparatus, for example, a chemical vapor deposition (CVD) apparatus 200 is illustrated as a semiconductor manufacturing apparatus. In the example of FIG. 1, the CVD apparatus 200 of a multi-chamber type in which two film forming chambers 202 are disposed is illustrated. In the CVD apparatus 200, semiconductor substrates 204 (204*a*, 204*b*) on which a film is to be formed are disposed in the film forming chambers 202 controlled to a desired temperature. Then, vacuuming is performed through exhaust pipes 150 and 152 by a vacuum pump 400, and the source gas is supplied into the film forming chambers 202 controlled to a desired pressure by pressure adjusting valves 210. In the film forming chambers 202, desired films are formed on the substrates 204 by chemical reaction of the source gas. For example, a silane ($SiH_4$)-based gas is introduced as a main source gas to form a silicon oxide film (SiO film) or a silicon nitride film (SiN film). Alternatively, for example, tetraethoxysilane (TEOS) gas or the like is introduced as a main source gas to form a silicon oxide film (SiO film). When these films are formed, products due to such a source gas are deposited in the film forming chambers 202 and the exhaust pipes 150 and 152. Therefore, in the film forming process cycle, a cleaning step is performed in addition to the film forming step.

In the cleaning step, a cleaning gas such as nitrogen trifluoride ($NF_3$) gas or a purge gas such as argon (Ar) gas is supplied to remote plasma source (RPS) apparatuses 300 disposed upstream from the film forming chambers 202. Then, fluorine (F) radicals are generated by plasma. Then, by supplying (diffusing) F radicals into the film forming chambers 202 and toward the exhaust pipe 150, products that are deposited are cleaned. For example, silicon tetrafluoride ($SiF_4$) generated after decomposition of the deposit by cleaning has high volatility, and thus is exhausted from the vacuum pump 400 through the exhaust pipes 150 and 152.

However, the F radicals hardly reach portions of the exhaust pipes 150 and 152 away from the film forming chambers 202, and the cleaning performance is deteriorated at the portions. In particular, at positions close to the inlet port of the vacuum pump 400, the cleaning rate is lower because the pressure is lower. As a result, the inside of the exhaust pipes 150 and 152 may be blocked by the deposited products. In addition, the gap between the rotor and the casing may be filled with the products deposited in the vacuum pump 400, which causes an overload state and then the vacuum pump 400 may be stopped. Therefore, in the first embodiment, an exhaust pipe device 100 is disposed at a position closer to the inlet port of the vacuum pump 400 than to the film forming chambers 202 as illustrated in FIG. 1.

In FIG. 1, the exhaust pipe device 100 in the first embodiment functions as a part of an exhaust pipe including the exhaust pipes 150 and 152 disposed between the film forming chambers 202 and the vacuum pump 400 that exhausts gas inside the film forming chambers 202. The exhaust pipe device 100 includes an outer pipe 102, an inner pipe 190 (dielectric pipe) made of a dielectric, and a plasma generation circuit 106. For the outer pipe 102, for example, a pipe material of the same material as that of the normal exhaust pipes 150 and 152 is used. For example, a stainless steel material such as SUS 304 is used. However, as a material of the outer pipe 102, SUS 316 steel material is more preferably used from the viewpoint of corrosion resistance against the cleaning gas. In addition, for the outer pipe 102, for example, a pipe material having the same size as that of the normal exhaust pipes 150 and 152 is used. However, the material and size are not limited to those described above. A pipe having a size larger than that of the exhaust pipes 150 and 152 may be used. Alternatively, a pipe having a smaller size may be used.

Flanges are disposed at both end portions of the inner pipe 190 and the outer pipe 102, one end portions thereof are connected to the exhaust pipe 150 having a flange of the same size, and the other end portions thereof are connected to the exhaust pipe 152 having a flange of the same size. In FIG. 1, a clamp and the like for fixing the flanges of the exhaust pipe device 100 and the flanges of the exhaust pipes 150 and 152 are not illustrated. Hereinafter, the same applies to each drawing. In addition, a seal material such as an O-ring used for connection with the exhaust pipes 150 and 152 is not illustrated. Hereinafter, in each embodiment, the exhaust pipe 152 is sandwiched between the exhaust pipe device 100 and the vacuum pump 400, but the present invention is not limited to this configuration. The exhaust pipe device 100 may be disposed directly at the inlet port of the vacuum pump 400. The inner pipe 190 made of a dielectric is disposed inside the outer pipe 102. The plasma generation circuit 106 generates capacitively coupled plasma (CCP) inside the inner pipe 190 made of a dielectric using an electrode disposed on the outer periphery of the inner pipe 190 to be described below.

Figure 2:
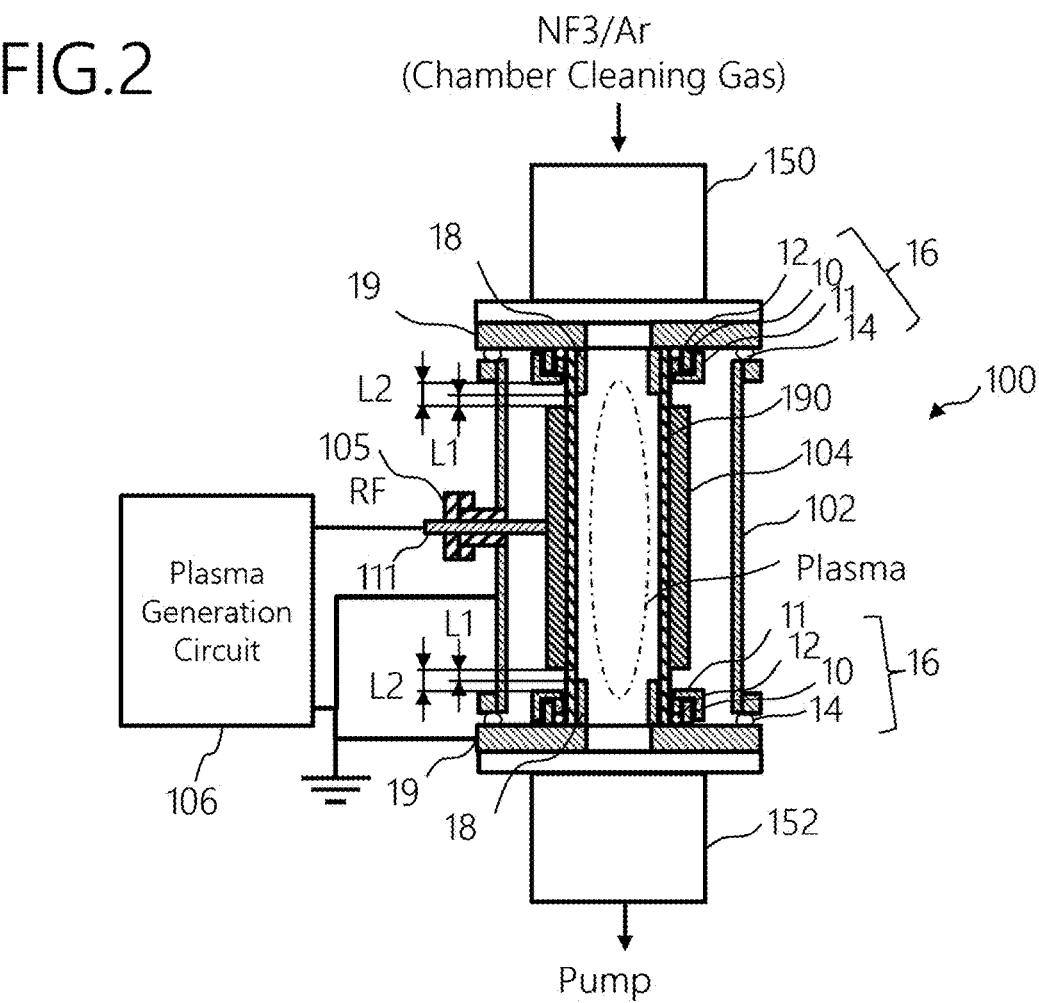
FIG. 2 is a cross-sectional view of an example of an exhaust pipe device according to the first embodiment as viewed from the front side.
Figure 3:
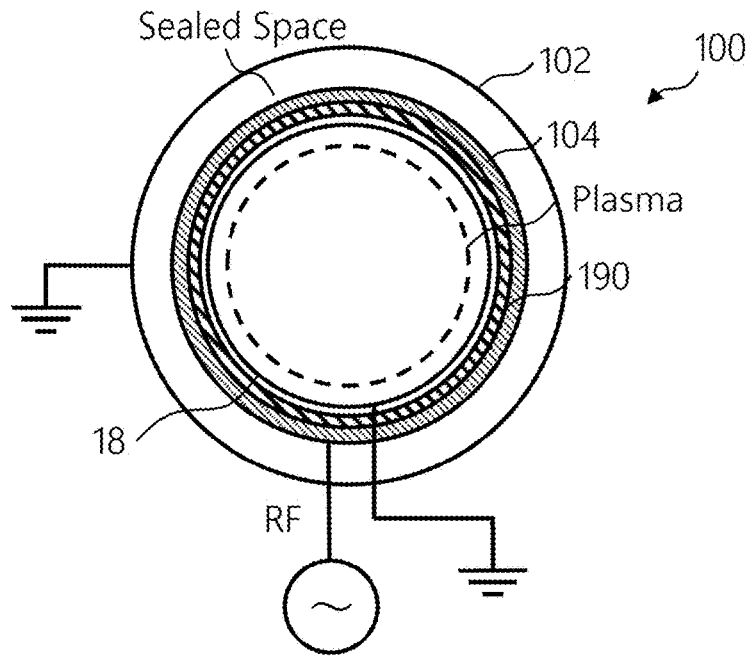
FIG. 3 is a cross-sectional view of an example of the exhaust pipe device according to the first embodiment as viewed from the upper side.

FIG. 2 is a cross-sectional view of an example of the exhaust pipe device according to the first embodiment as viewed from the front side. FIG. 3 is a cross-sectional view of an example of the exhaust pipe device according to the first embodiment as viewed from the upper side. In FIG. 2, the cross-sectional structure is of the exhaust pipe device 100, and cross-sectional structures of other components are not illustrated. Hereinafter, the same applies to each cross-sectional view as viewed from the front side. In FIGS. 2 and 3, the exhaust pipe device 100 is formed in a double pipe structure of the outer pipe 102 and the inner pipe 190 made of a dielectric and disposed inside the outer pipe 102. The inner pipe 190 is formed to have a shape similar to that of the outer pipe 102. In the example of FIGS. 2 and 3, corresponding to the cylindrical outer pipe 102 having a circular cross section (annular), the cylindrical inner pipe 190 having a circular cross section (annular) similar to that of the outer pipe 102 is used. Alternatively, corresponding to a cylindrical outer pipe 102 having a rectangular cross section, a cylindrical inner pipe 190 having a rectangular cross section similar to that of the outer pipe 102 may be used.

The inner pipe 190 is disposed with a space from the inner wall of the outer pipe 102. The material of the dielectric to be the inner pipe 190 may be any material having a dielectric constant larger than that of air. As a material of the inner pipe 190, for example, quartz, alumina ($Al_2O_3$), yttria ($Y_2O_3$), hafnia ($HfO_2$), zirconia ($ZrO_2$), magnesium oxide (MgO), aluminum nitride (AlN), or the like is preferably used. The thickness of the inner pipe 190 may be appropriately set as long as the exhaust performance is not hindered.

A radio-frequency electrode 104 is disposed inner than the outer pipe 102 and on the outer periphery side of the inner pipe 190. The radio-frequency electrode 104 is formed in a shape corresponding to the outer peripheral shape of the inner pipe 190. Corresponding to the cylindrical (annular) inner pipe 190 having a circular cross section, the cylindrical (annular) radio-frequency electrode 104 having a similar circular cross section is used. The radio-frequency electrode 104 is desirably disposed in contact with the inner pipe 190, but this configuration is not necessary.

Flanges 19 are disposed on the end portion side of the inner pipe 190. In the example of FIG. 2, the flanges 19 for piping are disposed at both end portions of the inner pipe 190. The flange 19 disposed upstream with respect to the flow of the gas and the flange of the exhaust pipe 150 are fixed to each other. The flange 19 disposed downstream with respect to the flow of the gas and the flange of the exhaust pipe 152 are fixed to each other. For both of the flanges 19, for example, a pipe material of the same material as that of the normal exhaust pipes 150 and 152 is used. For example, a stainless steel material such as SUS 304 is used. However, as a material of the flanges 19, SUS 316 steel material is more preferably used from the viewpoint of corrosion resistance against the cleaning gas.

In the first embodiment, as illustrated in FIG. 2, the space between the outer pipe 102 and the inner pipe 190 is blocked from the ambient atmosphere and the space in the inner pipe 190 by seal mechanisms 16 disposed at the upper and lower end portions of the inner pipe 190 and the outer pipe 102 covering the outer periphery side of the inner pipe 190. The seal mechanisms 16 are preferably configured as follows, for example. Each of the seal mechanisms 16 includes a protrusion 10, an O-ring retainer 11, an O-ring 12, and an O-ring 14. Protrusions 10 are provided in a ring shape on the surfaces of the respective flanges 19 at both end portions of the inner pipe 190, and extend from the surfaces of the respective flanges 19 toward the radio-frequency electrode 104, on the outer side of the inner pipe 190. The O-ring 14 (of an upstream side) closer to the exhaust pipe 150 is disposed between the flange surface (of an upstream side) of the outer pipe 102 closer to the exhaust pipe 150 and the flange 19. The O-ring 14 (of a downstream side) closer to the exhaust pipe 152 is disposed between the flange surface (of a downstream side) of the outer pipe 102 closer to the exhaust pipe 152 and the flange 19. In such a case, on the upstream side of the exhaust pipe device 100, the flange of the outer pipe 102 and the flange of the pipe 150 are preferably clamp-connected with the flange 19 interposed therebetween. On the downstream side of the exhaust pipe device 100, the flange of the outer pipe 102 and the flange of the pipe 152 are preferably clamp-connected with the flange 19 interposed therebetween. The O-ring 14 shields the atmosphere inside the outer pipe 102 from the ambient atmosphere.

Each O-ring 12 is disposed in a state of being pressed between the outer peripheral surface of the end portion of the inner pipe 190 and the inner peripheral surface of the protrusion 10. Therefore, the protrusion 10 is formed to have the inner diameter larger than the outer diameter size of the inner pipe 190 and have the outer diameter smaller than the inner diameter size of the outer pipe 102. Each O-ring 12 is pressed by the O-ring retainer 11. The O-ring retainer 11 may be formed as one member, or may be formed as a combination of two members, that is, a ring-shaped member disposed between the outer peripheral surface of the end portion of the inner pipe 190 and the inner peripheral surface of the protrusion 10, and an outer member supporting the ring-shaped member as illustrated in FIG. 2. As a result, the atmosphere in the inner pipe 190 is shielded from the space between the outer pipe 102 and the inner pipe 190 via the O-ring 12.

In the first embodiment, by forming the sealed double pipe structure of the outer pipe 102 and the inner pipe 190 as described above, it is possible to prevent the gas flowing through the exhaust pipe from leaking to the ambient atmosphere even when the inner pipe 190 made of the dielectric is damaged. Similarly, it is possible to prevent atmospheric air from intruding into (inflow to) the exhaust pipe. Even when the space between the outer pipe 102 and the inner pipe 190 is controlled to the atmospheric pressure, it is possible to prevent inflow of the atmospheric air to such an extent that a failure of the vacuum pump 400 occurs because the volume of the space between the outer pipe 102 and the inner pipe 190 is small.

In the example of FIGS. 2 and 3, a radio-frequency (RF) electric field is applied to the radio-frequency electrode 104 by the plasma generation circuit 106. Specifically, an introduction terminal 111 (an example of a radio-frequency introduction terminal) is introduced into the outer pipe 102 from an introduction terminal port 105 connected to the outer peripheral surface of the outer pipe 102, and the introduction terminal 111 is connected to the radio-frequency electrode 104. In the first embodiment, the flanges 19 function as ground electrodes. The outer pipe 102 is also grounded.

Then, the plasma generation circuit 106 generates plasma inside the inner pipe 190 using capacitive coupling between the radio-frequency electrode 104 and the ground electrodes. Specifically, in a state where the flanges 19 are grounded to function as ground electrodes (a ground potential is applied), the plasma generation circuit 106 applies a radio-frequency (RF) voltage to the radio-frequency electrode 104 via the introduction terminal 111, thereby generating capacitively coupled plasma (CCP) in the inner pipe 190 made of the dielectric. In addition, since in the cleaning step, the cleaning gas such as the $NF_3$ gas described above is supplied at an upstream position, F radicals due to plasma are generated inside the inner pipe 190 by using the remaining cleaning gas. Then, the F radicals remove products deposited inside the inner pipe 190. Thus, high cleaning performance can be exhibited in the exhaust pipe.

Thereafter, for example, $SiF_4$ generated after decomposition of the deposit by F radicals has high volatility, and thus is exhausted by the vacuum pump 400 through the exhaust pipe 152. In addition, a part of the radicals generated in the exhaust pipe device 100 enters the vacuum pump 400 through the exhaust pipe 152, and cleans the products deposited in the vacuum pump 400. As a result, the amount of products deposited in the vacuum pump 400 can be reduced. For example, the F radicals generated by the plasma generated at a part of the inner wall surface on the lower end portion side of the inner pipe 190 can be caused to enter the vacuum pump 400 in a state where the consumption inside the inner pipe 190 is small.

Figure 4:
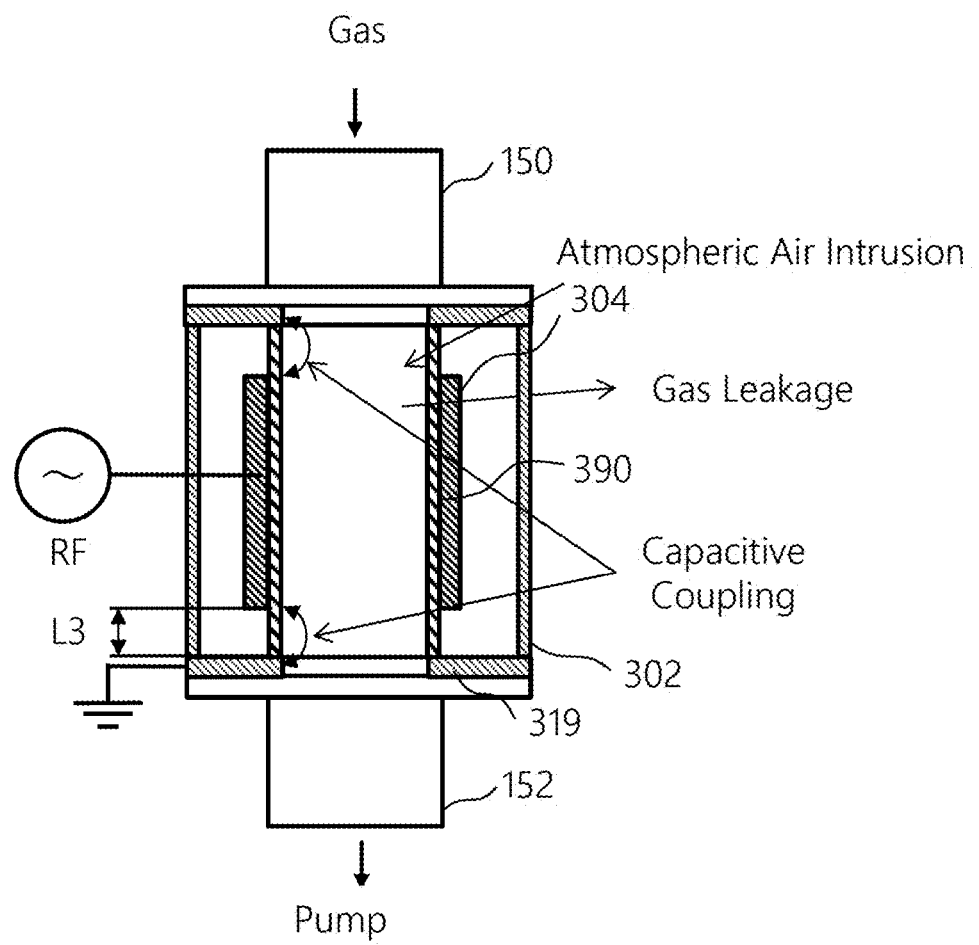
FIG. 4 is a front view of an example of an exhaust pipe device according to a comparative example of the first embodiment.

FIG. 4 is a front view of an example of an exhaust pipe device according to a comparative example of the first embodiment. In a comparative example of FIG. 4, a case where a radio-frequency electrode 304 is disposed in a space between an outer pipe 302 outer than a dielectric pipe 390 and the dielectric pipe 390 is illustrated. At both end portions of the dielectric pipe 390, pipe flanges 319 that function as ground electrodes are disposed. Then, capacitively coupled plasma (CCP) is generated by applying a radio-frequency (RF) voltage to the radio-frequency electrode 304 using the flanges 319 as ground electrodes. In such a configuration, the flanges 319 and the radio-frequency electrode 304 may be capacitively coupled to cause electric discharge. The electric discharge may occur not only inside the dielectric pipe 390 but also on the atmospheric air side outside the dielectric pipe 390. Therefore, it is necessary to increase a distance L3 between the flange 319 (ground electrode) and the radio-frequency electrode 304 to be large enough not to cause electric discharge. In a case where the distance L3 between the flange 319 (ground electrode) and the radio-frequency electrode 304 is large, increase of the gas flow rate and the pressure in the dielectric pipe 390 makes it difficult to generate plasma, causing unstable electric discharge. On the other hand, decrease of the electrode size of the radio-frequency electrode 304 in the gas flow direction to increase the voltage and/or decrease of the distance L3 between the flange 319 (ground electrode) and the radio-frequency electrode 304 can make it easy to generate plasma, but abnormal electric discharge (arcing) occurs on the atmospheric air side.

Therefore, in the first embodiment, as illustrated in FIG. 2, the ground electrode is disposed such that the distance to the radio-frequency electrode 104 is smaller on the inner side than on the outer side of the inner pipe 190. Specifically, a ring-shaped protrusion 18 extending from the surface of each flange 19 toward the radio-frequency electrode 104 is formed on the inner side of the inner pipe 190. Each protrusion 18 is made of a conductive material and functions as a part of the ground electrode. Each protrusion 18 is formed integrally with the flange 19 to which the protrusion is connected, for example. Alternatively, each protrusion 18 may be formed separately from the flange 19 as long as it is electrically connected to the flange 19. In addition, when each O-ring retainer 11 is made of a conductive material, each O-ring retainer 11 functions as a part of the ground electrode by being brought into contact with the protrusion 10.

In the example of FIG. 2, the tip of the protrusion 10 or the exposed surface of the O-ring retainer 11 on the side of the radio-frequency electrode 104 is closest to the radio-frequency electrode 104 on the outer side of the inner pipe 190. Thus, the protrusion 18 is formed such that a distance L2 between the tip of the protrusion 18 and the radio-frequency electrode 104 is smaller than a distance L2 between the radio-frequency electrode 104 and the tip of the protrusion 10 on the outer side of the inner pipe 190 or the exposed surface of the O-ring retainer 11 on the side of the radio-frequency electrode 104. When there is no protrusion 10, the protrusion 18 is disposed such that the distance L2 between the tip of the protrusion 18 and the radio-frequency electrode 104 is smaller than the distance between the flange surface on the outer side of the inner pipe 190 and the radio-frequency electrode 104. Accordingly, when a radio-frequency voltage is applied to the radio-frequency electrode 104, electric discharge occurs first between the protrusion 18 and the radio-frequency electrode 104. Therefore, it is not necessary to increase the applied voltage to a voltage that causes abnormal electric discharge (arcing) on the atmospheric air side. Thus, it is possible to generate plasma due to capacitive coupling inside the inner pipe 190 without causing abnormal electric discharge (arcing) on the atmospheric air side. Decrease of the distance between the electrodes on the vacuum side can further enhance ignitability and stability of plasma in addition to suppression of arcing.

Note that it is desirable that the protrusion 18 be disposed such that the distance L1 between the tip of the protrusion 18 and the radio-frequency electrode 104 is even smaller than the distance between the grounded outer pipe 102 and the radio-frequency electrode 104.

As described above, according to the first embodiment, it is possible to remove products deposited inside the exhaust pipe near the vacuum pump while avoiding abnormal electric discharge such as arcing.

Second Embodiment

In the first embodiment, the ground electrode is disposed such that the distance from the radio-frequency electrode 104 is smaller on the inner side than on the outer side of the inner pipe 190. However, a method for avoiding abnormal electric discharge (arcing) on the atmospheric air side is not limited to the method described above. In a second embodiment, a configuration for eliminating exposure of a metal portion on the atmospheric air side will be described. Further, points not specifically described below are the same as those of the first embodiment.

Figure 5:
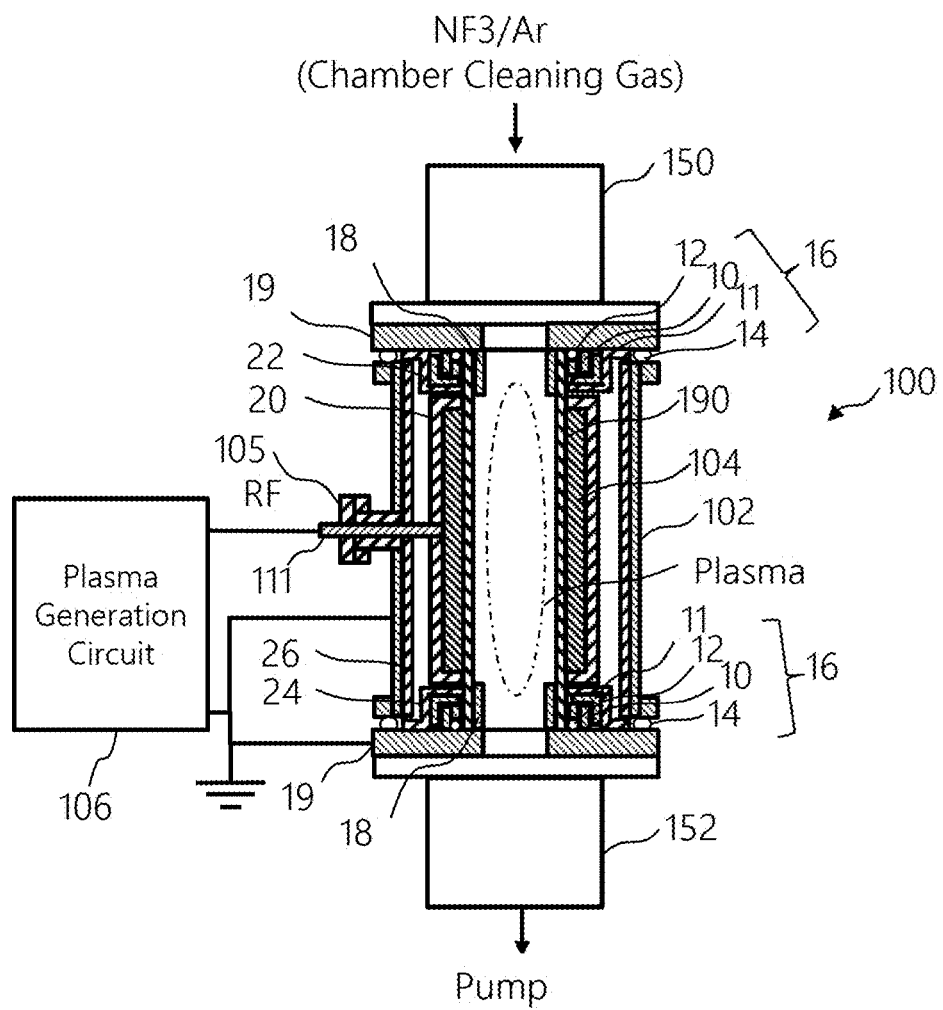
FIG. 5 is a cross-sectional view of an example of an exhaust pipe device according to a second embodiment as viewed from the front side.

FIG. 5 is a cross-sectional view of an example of an exhaust pipe device according to a second embodiment as viewed from the front side. A cross-sectional view of an example of the exhaust pipe device according to the second embodiment as viewed from the upper side is not provided. In the example of FIG. 5, outside an inner pipe 190, at least a metal portion serving as a ground electrode at a position facing a radio-frequency electrode 104 and the radio-frequency electrode 104 are shielded from each other by a dielectric having a dielectric constant higher than that of air. For this purpose, for example, at least one of the radio-frequency electrode 104 and the ground electrode is covered with an electrode cover made of a dielectric outside the inner pipe 190.

Specifically, outside the inner pipe 190, the radio-frequency electrode 104, except for the inner peripheral surface thereof, is covered with a radio-frequency electrode cover 20 made of a dielectric. In the example of FIG. 5, outside the inner pipe 190, the exposed surface of the ground electrode including a surface of the flange 19 (of an upstream side) closer to the exhaust pipe 150, a protrusion 10, and an O-ring retainer 11 is further covered with a dielectric ground electrode cover 22. Similarly, outside the inner pipe 190, the exposed surface of the ground electrode including a surface of the flange 19 (of a downstream side) closer to the exhaust pipe 152, a protrusion 10, and an O-ring retainer 11 is further covered with a dielectric ground electrode cover 24. In addition, an inner peripheral surface, which faces the radio-frequency electrode 104, of the outer pipe 102 made of a conductive material is also covered with an outer pipe cover 26 made of a dielectric. The thickness of each cover made of a dielectric may be appropriately set. Other than the points described above, the configuration is similar to that in FIG. 2.

Then, the plasma generation circuit 106 generates plasma inside the inner pipe 190 using capacitive coupling between the radio-frequency electrode 104 and the ground electrodes. Specifically, in a state where the flanges 19 are grounded to function as ground electrodes (a ground potential is applied), the plasma generation circuit 106 applies a radio-frequency (RF) voltage to the radio-frequency electrode 104 via the introduction terminal 111, thereby generating capacitively coupled plasma (CCP) in the inner pipe 190 made of the dielectric. As a result, similarly to the first embodiment, it is possible to remove products deposited inside the exhaust pipe near the vacuum pump.

In the example of FIG. 5, the metal portion on the atmospheric air side is covered with a dielectric. Thus, even when the voltage applied to the radio-frequency electrode 104 is increased, plasma due to capacitive coupling can be generated inside the inner pipe 190 while arcing on the atmospheric air side is suppressed. Furthermore, even in a case where a protrusion 18 is not disposed, it is possible to generate plasma due to capacitive coupling between the radio-frequency electrode 104 and surfaces of the flanges 19 (ground electrodes) inside the inner pipe 190 while arcing on the atmospheric air side is suppressed since the metal portion on the atmospheric air side is covered with a dielectric.

Third Embodiment

In each of the above-described embodiments, the double pipe structure is formed to avoid leakage and atmospheric air intrusion due to damage of the inner pipe 190 made of a dielectric. Causes of a damage of the inner pipe 190 made of a dielectric may include an increase of the temperature of the inner pipe 190. In a third embodiment, a configuration capable of suppressing an increase of the temperature of the inner pipe 190 will be described. Further, points not specifically described below are the same as those of the first embodiment.

Figure 6:
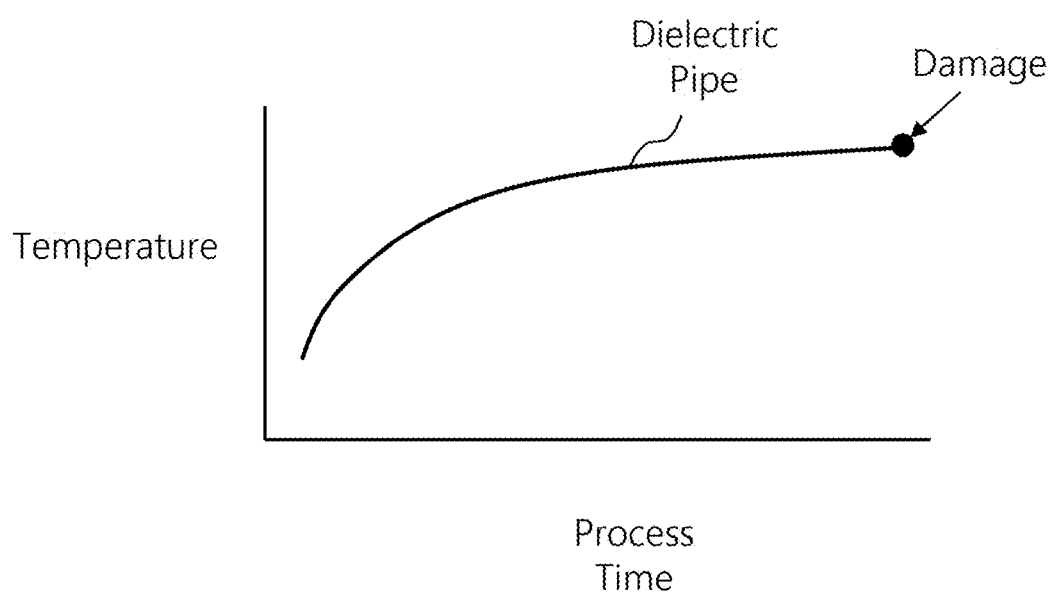
FIG. 6 is a graph for describing the relationship between the inner pipe temperature and the cleaning process time in a third embodiment.

FIG. 6 is a graph for describing the relationship between the inner pipe temperature and the cleaning process time in the third embodiment. In FIG. 6, the vertical axis represents the temperature of the inner pipe in the exhaust pipe, and the horizontal axis represents the continuous process time for the exhaust pipe in the cleaning step. In addition, the graph illustrated in the example of FIG. 6 illustrates an example of a case where the inner pipe 190 is used without being cooled. In the cleaning step, the radio-frequency voltage is applied to the radio-frequency electrode 104. Thus, the temperature of the radio-frequency electrode 104 increases. As a result, the temperature of the inner pipe 190, which is a dielectric and inside which plasma is generated, increases. As illustrated in the graph of FIG. 6, if the process is continued without cooling, the temperature increases as the cleaning process time becomes longer, and the inner pipe 190 may eventually be damaged. In order to suppress the damage of the inner pipe 190 made of a dielectric due to the temperature increase, it is desirable to cool the inner pipe 190.

As means to that, for example, in the comparative example illustrated in FIG. 4, the outer peripheral surface of the outer pipe 302 arranged on the outer periphery of the dielectric pipe 390 and the radio-frequency electrode 304 may be cooled by supplying cooling water. However, even if the outside of the outer pipe 302 is cooled, it is difficult to sufficiently cool the space between the outer pipe 302 and the dielectric pipe 390 via the outer pipe 302. Therefore, the cooling of the outer pipe 302 may result in increase of the temperature of the dielectric pipe 390 and then damage of the dielectric pipe 390. Therefore, in the third embodiment, a cooling mechanism is disposed in the exhaust pipe device. The cooling mechanism cools the inner pipe by introducing refrigerant into at least one of a space between the outer pipe and the inner pipe and a member in the space.

Figure 7:
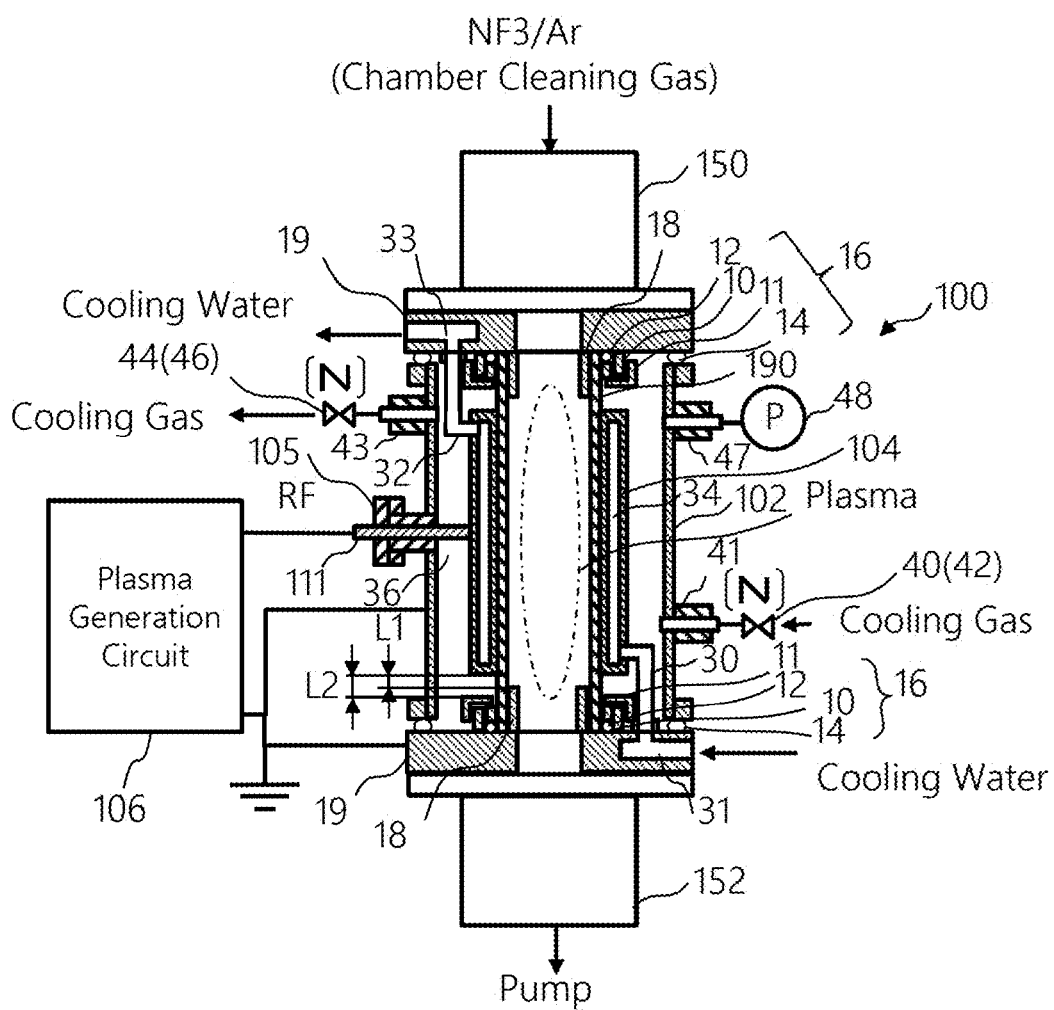
FIG. 7 is a cross-sectional view of an example of an exhaust pipe device according to the third embodiment as viewed from the front side.

FIG. 7 is a cross-sectional view of an example of an exhaust pipe device according to a third embodiment as viewed from the front side. A cross-sectional view of an example of the exhaust pipe device according to the third embodiment as viewed from the upper side is not provided. In the example of FIG. 7, a cavity 34 is formed in a radio-frequency electrode 104. The cavity 34 is preferably formed over the whole of the inside of the radio-frequency electrode 104.

In the example of FIG. 7, cooling water (an example of a refrigerant) is supplied into the cavity 34 in the radio-frequency electrode 104, which is an example of a member in a space 36 between an outer pipe 102 and an inner pipe 190. Specifically, the exhaust pipe device is configured as follows. In the example of FIG. 7, a cavity 31 is formed inside a flange 19 (of a downstream side) closer to the exhaust pipe 152. Similarly, a cavity 33 is formed inside a flange 19 (of an upstream side) closer to the exhaust pipe 150. The cavities 31 and 33 may be formed over the whole or a part of the inside of the respective flanges 19. For example, each cavity may be formed to have an L shape including two cylindrical cavities extending linearly that are connected to each other. The cavity 31 has an inflow port formed in a side surface of the flange 19, and an outflow port formed on the side of the space 36 between the outer pipe 102 and the inner pipe 190. The cavity 33 has an inflow port formed on the side of the space 36 between the outer pipe 102 and the inner pipe 190, and an outflow port formed in a side surface of the flange 19. A cooling pipe 30 connects the outflow port of the cavity 31 and the lower portion of the cavity 34 in the radio-frequency electrode 104. A cooling pipe 32 connects the upper portion of the cavity 34 in the radio-frequency electrode 104 and the inflow port of the cavity 33. The flange 19 in which the cavity 31 is formed, the flange 19 in which the cavity 33 is formed, the cooling pipes 30 and 32, and the radio-frequency electrode 104 in which the cavity 34 is formed are parts of the cooling mechanism in the third embodiment.

In the example of FIG. 7, the cooling water supplied to the side surface of the (downstream) flange 19 closer to the exhaust pipe 152 passes through the cavity 31 in the flange 19 (of a downstream side) closer to the exhaust pipe 152, passes through the cooling pipe 30, and flows to the lower portion of the cavity 34 in the radio-frequency electrode 104. The cooling water supplied to the lower portion of the cavity 34 in the radio-frequency electrode 104 accumulates in the cavity 34 from the lower portion to the upper portion. The cooling water having overflowed from the upper portion of the cavity 34 in the radio-frequency electrode 104 passes through the cooling pipe 32 and flows to the cavity 33 in the flange 19 (of an upstream side) closer to the exhaust pipe 150. Then, the water passes through the cavity 33 in the flange 19 and is drained from the outflow port in the side surface of the flange 19.

In a state where the cooling water is flowing, the plasma generation circuit 106 generates plasma inside the inner pipe 190 using the radio-frequency electrode 104. The plasma generation circuit 106 applies a radio-frequency voltage to the radio-frequency electrode 104.

Specifically, the plasma generation circuit 106 applies a radio-frequency voltage to the radio-frequency electrode 104 via the introduction terminal 111 in a state where the flanges 19 and the protrusions 18 are grounded as the ground electrodes, thereby generating capacitively coupled plasma (CCP) in the inner pipe 190 made of a dielectric disposed inside the radio-frequency electrode 104. At this time, the inner pipe 190 which is made of a dielectric and whose temperature increases due to plasma generation, and the space 36 between the inner pipe 190 and the outer pipe 102 are cooled using the cooling water flowing in the radio-frequency electrode 104. As a result, the radio-frequency electrode 104, to which the radio-frequency voltage is applied and whose temperature increases, is directly cooled, and the inner pipe 190 in contact with the inner peripheral surface of the radio-frequency electrode 104 is cooled. Therefore, the temperature increase of the inner pipe 190 can be further suppressed than a case where the outer pipe 102 is cooled from the outside.

As illustrated in FIG. 7, the cooling mechanism of the third embodiment further includes a gas introduction port 41, a valve 40 (or a check valve 42), a gas discharge port 43, and a valve 44 (or a check valve 46). The cooling mechanism introduces a cooling gas (another example of a refrigerant) into the space 36 between the inner pipe 190 and the outer pipe 102 from the gas introduction port 41 provided in a lower portion of the outer peripheral surface of the outer pipe 102 via the valve 40 (or the check valve 42). Then, the cooling gas is discharged to the outside from the gas discharge port 43 provided in an upper portion of the outer peripheral surface of the outer pipe 102 via the valve 44 (or the check valve 46). By causing the cooling gas to flow into the space 36 between the inner pipe 190 and the outer pipe 102, the inner pipe 190, which is made of a dielectric and whose temperature increases due to plasma generation, and the space 36 between the inner pipe 190 and the outer pipe 102 are cooled. Since the inner pipe 190 is cooled by the cooling gas, damage of the inner pipe 190 can be suppressed. As the cooling gas, for example, air is used.

The cooling gas is introduced into the space 36 between the inner pipe 190 and the outer pipe 102 at a pressure higher than atmospheric pressure. Therefore, the pressure in the space 36 between the inner pipe 190 and the outer pipe 102 is controlled to be higher than the pressure in the space inside the inner pipe 190 and the atmospheric pressure. The pressure in the space 36 between the inner pipe 190 and the outer pipe 102 is measured by a pressure sensor 48 via a vent 47 formed in the outer peripheral surface of the outer pipe 102, and fluctuations in the pressure in the space 36 are monitored. Here, in a case where the inner pipe 190, which is made of a dielectric and whose temperature increases due to plasma generation, is damaged, vacuum break may occur if a large amount of cooling gas flows into the vacuum side. Therefore, the damage of the inner pipe 190 is detected by the pressure sensor 48.

Specifically, when pressure decrease is detected by the pressure sensor 48, control is performed to block the valves 40 and 44. As a result, the inflow of the cooling gas into the exhaust line can be minimized. In a case where the check valve 42 is used instead of the valve 40, the check valve 42 in which the cracking pressure is set such that the check valve 42 is blocked when the pressure difference between the primary pressure and the secondary pressure is higher than 0.1 MPa and lower than the supply pressure of the cooling gas is used. When the supply of the cooling gas is stopped at the supply source, the primary pressure (the primary side of the check valve) is equal to the atmospheric pressure, the secondary pressure (inside the outer pipe 102) is equal to or lower than the atmospheric pressure (the pressure decreases to be lower than the atmospheric pressure due to damage), and the differential pressure is equal to or lower than 0.1 MPa. Therefore, when 0.1 MPa<cracking pressure<supply pressure is satisfied, the cooling gas does not flow. Therefore, if the supply of the cooling gas is stopped at the supply source in response to the detection of the damage of the inner pipe 190, the atmospheric air can be prevented from flowing into the outer pipe 102 even when the primary side is opened to the atmospheric air. In a case where the check valve 46 is used instead of the valve 44, damage of the inner pipe 190 makes the primary pressure lower than the secondary pressure, so that the flow path can be blocked. Therefore, the atmospheric air can be prevented from flowing into the outer pipe 102.

Other than the points described above, the configuration is similar to that in FIG. 2.

In the example of FIG. 7, the cooling mechanism that introduces cooling water and cooling gas as the refrigerant for cooling the inner pipe 190 has been described, but the present embodiment is not limited thereto. For example, a cooling mechanism that introduces only one of cooling water and cooling gas as the refrigerant for cooling the inner pipe 190 may be mounted.

Figure 8:
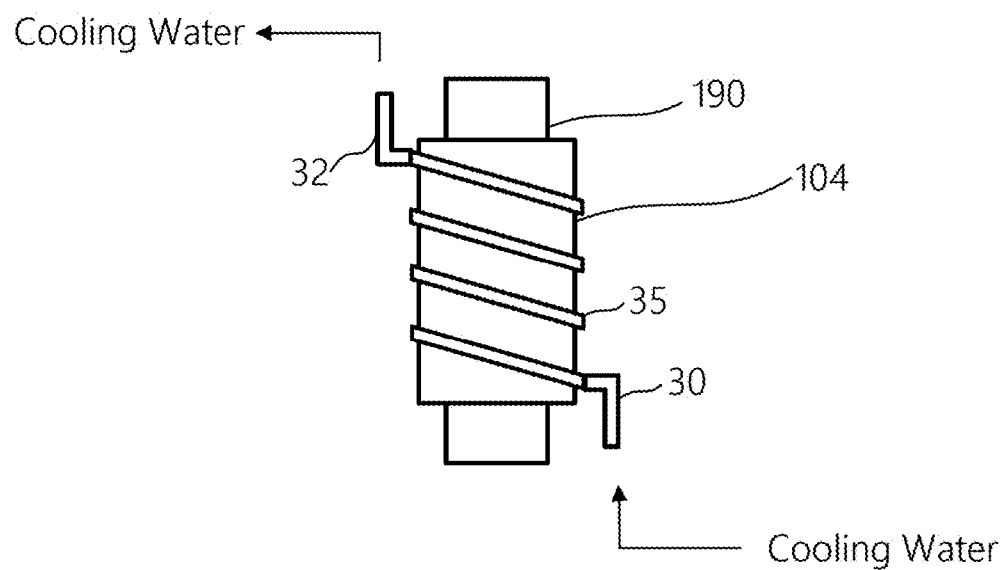
FIG. 8 is a configuration diagram illustrating an example of a configuration of a cooling mechanism according to a modification of the third embodiment.

FIG. 8 is a configuration diagram illustrating an example of a configuration of a cooling mechanism according to a modification of the third embodiment. In the modification of FIG. 8, as a cooling mechanism, a cooling pipe 35 is spirally wound around the outer peripheral surface of the radio-frequency electrode 104. The cooling pipe 30 is connected to a lower end portion of the cooling pipe 35. The cooling pipe 32 is connected to an upper end portion of the cooling pipe 35. Then, the cooling water supplied to the side surface of the (downstream) flange 19 closer to the exhaust pipe 152 passes through the cavity 31 in the (downstream) flange 19 closer to the exhaust pipe 152, passes through the cooling pipe 30, flows in the cooling pipe 35, and accumulates in the cooling pipe 35 from the lower portion to the upper portion. The cooling water having overflowed from the upper portion of the cooling pipe 35 passes through the cooling pipe 32 and flows to the cavity 33 in the (upstream) flange 19 closer to the exhaust pipe 150. Then, the water passes through the cavity 33 in the flange 19 and is drained from the outflow port in the side surface of the flange 19. The cooling water flowing in the cooling pipe 35 cools the radio-frequency electrode 104 and cools the inner pipe 190. Furthermore, the space 36 between the inner pipe 190 and the outer pipe 102 can also be cooled. Other than the points described above, the configuration is similar to that in FIG. 7.

The embodiments have been described with reference to the specific examples. However, the present invention is not limited to these specific examples.

In addition, all exhaust pipe devices that include the elements of the present invention and can be achieved by appropriate modification of design by those skilled in the art fall in the scope of the present invention.

While certain embodiments have been described, these embodiments have been presented by way of example only, and are not intended to limit the scope of the inventions. Indeed, the novel methods and devices described herein may be embodied in a variety of other forms; furthermore, various omissions, substitutions and changes in the form of the methods and devices described herein may be made without departing from the spirit of the inventions. The accompanying claims and their equivalents are intended to cover such forms or modifications as would fall within the scope and spirit of the inventions.

What is claimed is:

1. An exhaust pipe device functioning as a part of an exhaust pipe disposed between a film forming chamber and a vacuum pump that exhausts gas inside the film forming chamber, the device comprising:
    a dielectric pipe;
    a radio-frequency electrode which is disposed on an outer periphery side of the dielectric pipe and to which a radio-frequency voltage is applied;
    a ground electrode which is disposed on an end portion side of the dielectric pipe such that a closest distance from the radio-frequency electrode is smaller on an inner side than on an outer side of the dielectric pipe, and to which a ground potential is applied; and
    a plasma generation circuit that generates plasma inside the dielectric pipe.

2. The device according to claim 1, wherein the ground electrode includes a ring-shaped first protrusion disposed on the inner side of the dielectric pipe.

3. The device according to claim 1, wherein the ground electrode includes a flange disposed on the end portion side of the dielectric pipe.

4. The device according to claim 2, wherein
    the ground electrode further includes a flange disposed on the end portion side of the dielectric pipe, and
    the first protrusion is electrically connected to the flange.

5. The device according to claim 4, wherein the first protrusion is formed integrally with the flange.

6. The device according to claim 2, wherein the ground electrode further includes a ring-shaped second protrusion disposed on the outer side of the dielectric pipe.

7. The device according to claim 6, wherein a distance between a tip of the first protrusion and the radio-frequency electrode is smaller than a distance between a tip of the second protrusion and the radio-frequency electrode.

8. The device according to claim 1 further comprising an outer pipe disposed outside the dielectric pipe, wherein
    the radio-frequency electrode is disposed between the outer pipe and the dielectric pipe.

9. The device according to claim 8 further comprising a seal mechanism disposed at the end portion of the dielectric pipe and an end portion of the outer pipe.

10. The device according to claim 1 further comprising a dielectric that covers the radio-frequency electrode outside the dielectric pipe.

11. The device according to claim 1 further comprising a dielectric that covers the ground electrode outside the dielectric pipe.

12. The device according to claim 1, wherein
    the ground electrode includes a first part overlapping with the dielectric pipe on the inner side of the dielectric pipe and forming the closest distance from the radio-frequency electrode on the inner side of the dielectric pipe.

13. The device according to claim 12, wherein an overlapping length of the first part of the ground electrode with the dielectric pipe on the inner side of the dielectric pipe is larger than an overlapping length with the dielectric pipe of a second part of the ground electrode that forms the closest distance from the radio-frequency electrode on the outer side of the dielectric pipe.

14. The device according to claim 13, wherein the second part of the ground electrode overlaps with the dielectric pipe on the outer side of the dielectric pipe.

15. An exhaust pipe device functioning as a part of an exhaust pipe disposed between a film forming chamber and a vacuum pump that exhausts gas inside the film forming chamber, the device comprising:
   a dielectric pipe;
   a radio-frequency electrode which is disposed on an outer periphery side of the dielectric pipe and to which a radio-frequency voltage is applied;
   a ground electrode which is disposed on an end portion side of the dielectric pipe such that a closest distance from the radio-frequency electrode is smaller on an inner side than on an outer side of the dielectric pipe, and to which a ground potential is applied;
   a dielectric that covers at least one of the radio-frequency electrode and the ground electrode outside the dielectric pipe; and
   a plasma generation circuit that generates plasma inside the dielectric pipe.

16. The device according to claim 15, wherein
   the ground electrode includes a flange disposed on the end portion side of the dielectric pipe, and
   a portion of the flange outside the dielectric pipe is covered with the dielectric.

17. The device according to claim 15 further comprising an outer pipe disposed outside the dielectric pipe, wherein
   the radio-frequency electrode is disposed between the outer pipe and the dielectric pipe.

18. The device according to claim 17 further comprising a dielectric that covers a surface of the outer pipe made of a conductive material, the surface facing the radio-frequency electrode.

19. The device according to claim 15, wherein the ground electrode includes a ring-shaped first protrusion disposed on an inner side of the dielectric pipe.

20. The device according to claim 19, wherein
   the ground electrode further includes a ring-shaped second protrusion disposed on an outer side of the dielectric pipe, and
   the second protrusion is covered with the dielectric.

* * * * *